United States Patent
Takahara

(10) Patent No.: US 7,734,196 B2
(45) Date of Patent: Jun. 8, 2010

(54) OPTICAL RECEIVER DEVICE

(75) Inventor: Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 868 days.

(21) Appl. No.: 11/312,936

(22) Filed: Dec. 21, 2005

(65) Prior Publication Data

US 2007/0071457 A1 Mar. 29, 2007

(30) Foreign Application Priority Data

Sep. 26, 2005 (JP) ............................... 2005-278948

(51) Int. Cl.
*H04B 10/06* (2006.01)

(52) U.S. Cl. ...................... 398/208; 398/202; 398/212; 398/214

(58) Field of Classification Search ................. 398/154, 398/155, 158, 161, 202–214
See application file for complete search history.

(56) References Cited

U.S. PATENT DOCUMENTS

| | | | | |
|---|---|---|---|---|
| 4,501,002 | A | * | 2/1985 | Auchterlonie ................ 375/332 |
| 5,131,014 | A | * | 7/1992 | White .......................... 375/373 |
| 5,341,048 | A | * | 8/1994 | Randhawa et al. ............. 326/95 |
| 5,692,166 | A | * | 11/1997 | Milhizer et al. ............. 713/400 |
| 5,818,890 | A | | 10/1998 | Ford et al. |
| 6,212,246 | B1 | * | 4/2001 | Hendrickson ................ 375/355 |
| 2006/0171718 | A1 | * | 8/2006 | Hoshida ..................... 398/152 |

FOREIGN PATENT DOCUMENTS

| | | |
|---|---|---|
| JP | 1-188049 A | 7/1989 |
| JP | 5-110514 A | 4/1993 |
| JP | H10-112704 | 4/1998 |
| JP | 11-74890 A | 3/1999 |
| JP | 2000-59300 A | 2/2000 |
| JP | 2004-516743 | 6/2004 |
| WO | 02/51041 | 6/2002 |

OTHER PUBLICATIONS

Japanese Office Action issued in connection with corresponding JP Application No. 2005-278948. Mailed by the JPO on Oct. 7, 2008. Partial English translation.

* cited by examiner

*Primary Examiner*—Li Liu
(74) *Attorney, Agent, or Firm*—Fujitsu Patent Center

(57) ABSTRACT

A DQPSK receiver extracts first and second phase modulation components from an input optical signal, and respectively converts the extracted components into the first and second data signals. The DQPSK receiver extracts a clock signal from one of the data signals, and produces an inverted clock signal by inverting the extracted clock signal. Then, the DQPSK receiver latches the first data signal by using the extracted clock signal or the inverted clock signal, and latches the second data signal by using the extracted clock signal.

6 Claims, 25 Drawing Sheets

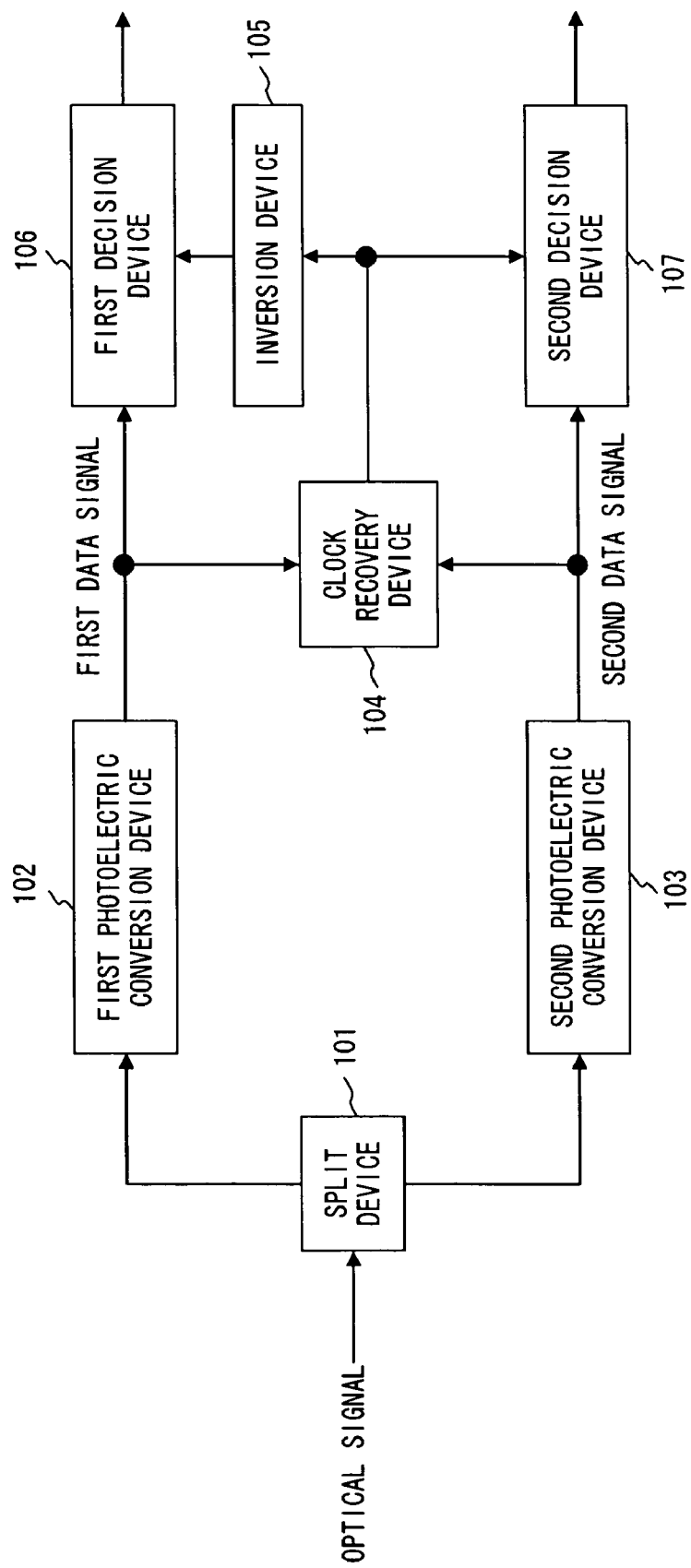
F I G. 2

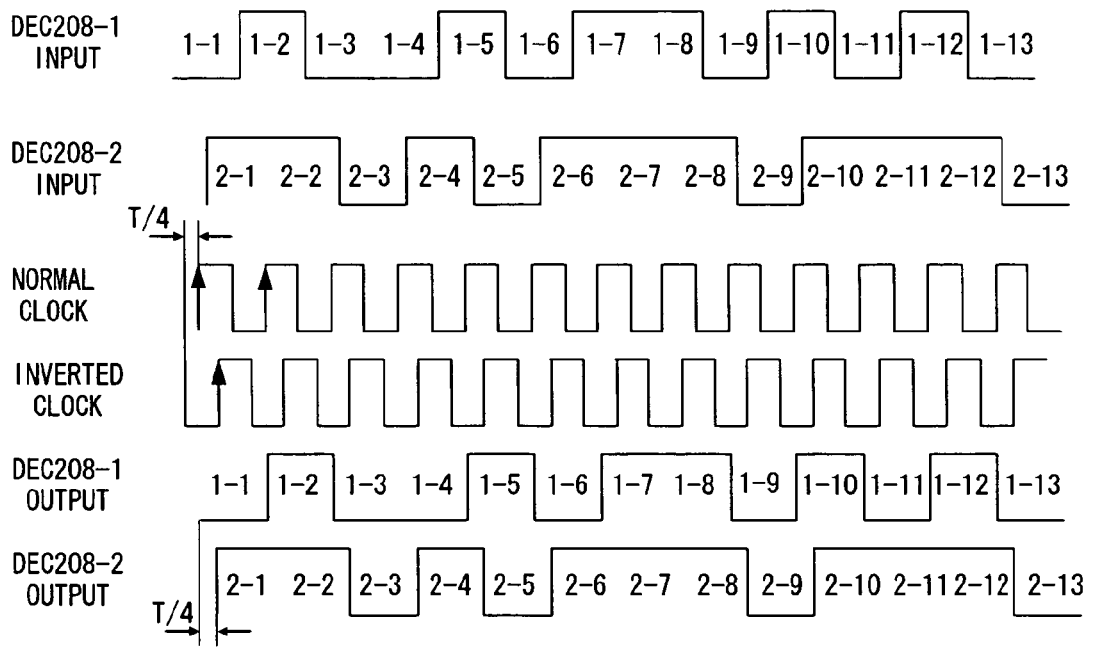
F I G. 5 A

| PHASE INPUT TO DEC AT FIRST STAGE | DEC207-1 CLOCK | DEC208-2 CLOCK |
|---|---|---|
| IN-PHASE | NORMAL | NORMAL |
| DEC207-2 DELAYS BY T | INVERTED | INVERTED |
| DEC207-1 DELAYS BY T | INVERTED | NORMAL |

FIG. 12

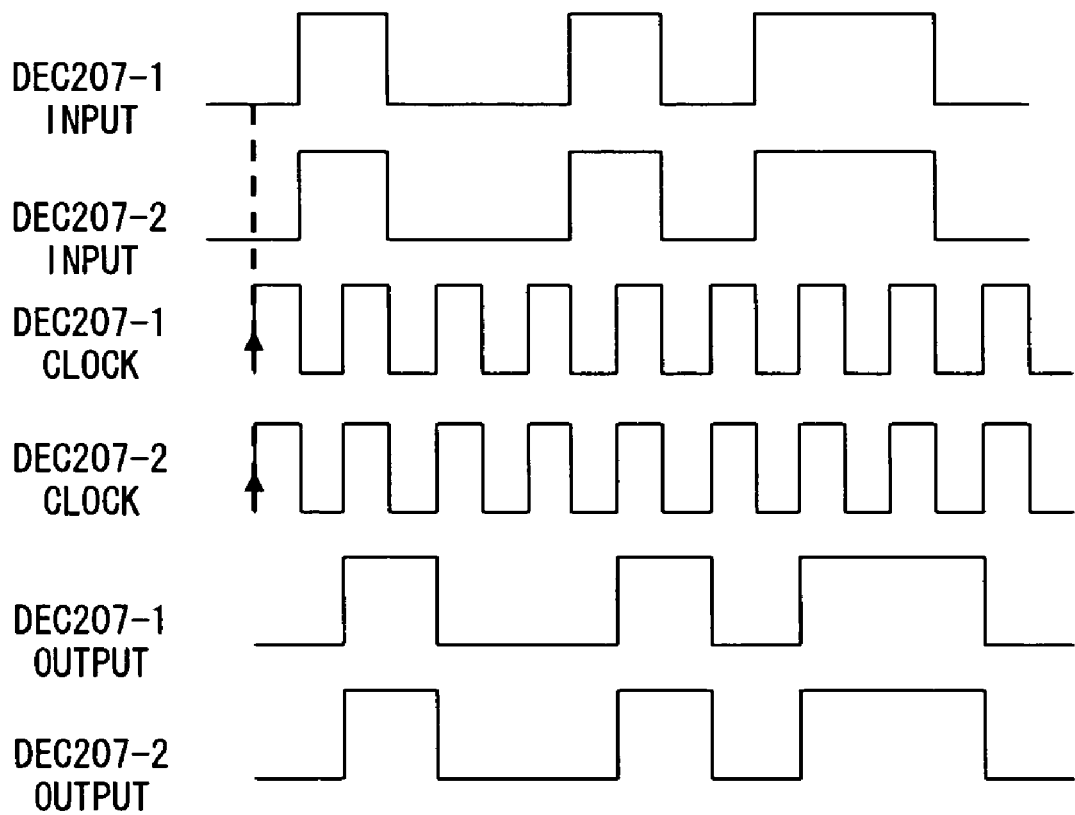
F I G. 1 3

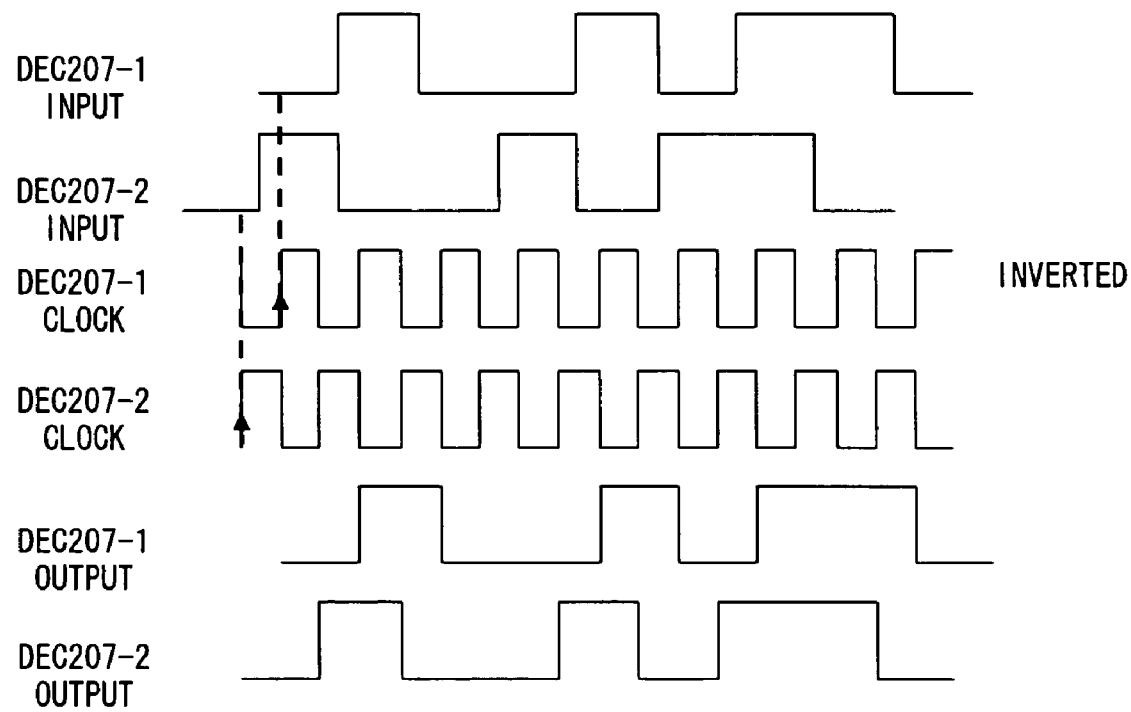
F I G. 1 5

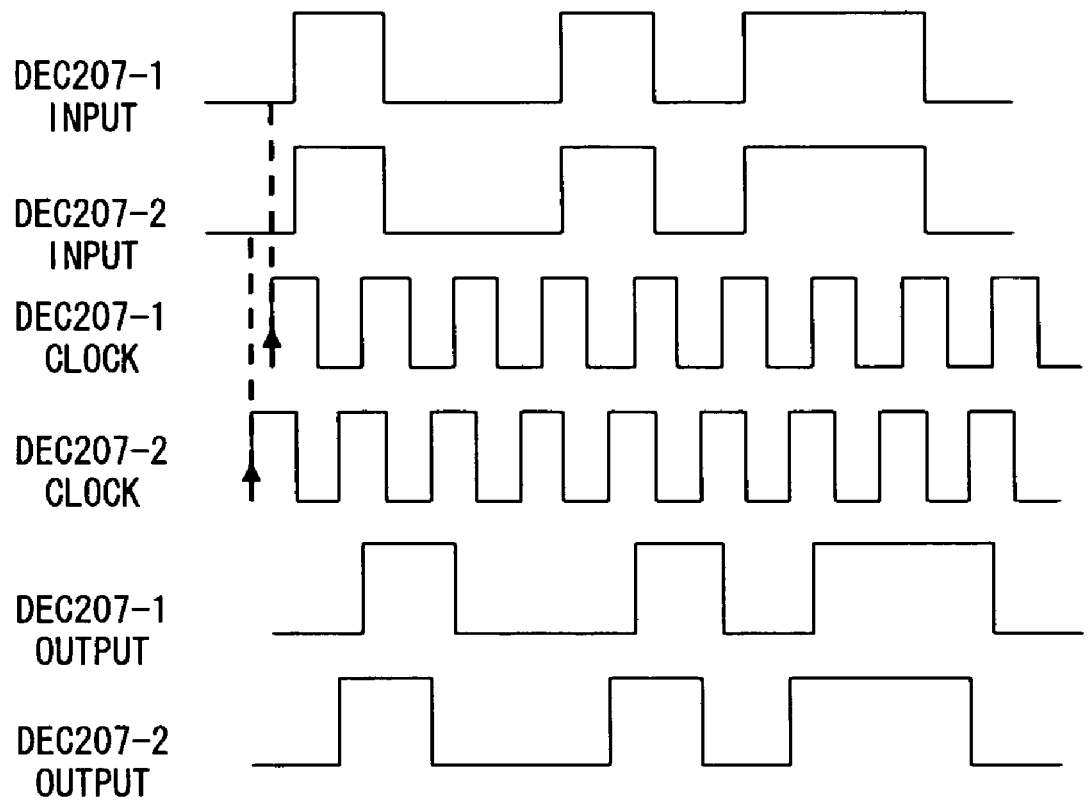
F I G. 16

US 7,734,196 B2

OPTICAL RECEIVER DEVICE

BACKGROUND OF THE INVENTION

1. Field of the Invention

The present invention relates to an optical receiver device for receiving optical signals modulated using Differential Quadrature Phase Shift Keying (DQPSK) in an optical transmission system.

2. Description of the Related Art

In recent years, an optical transmission system which employs the DQPSK modulation is proposed as one of solutions for expanding bandwidth in an optical communication network (for example, see Patent Document 1 below). In this modulation method, two bits of information are transmitted in one symbol, thereby, a bit rate of 40 Gb/s at a modulation rate of 20 Gbaud/s is realized. In this optical transmission system, an optical. transmitter device modulates optical carrier waves using the DQPSK and transmits them as the optical signals, and an optical receiver device demodulates the received optical signals and extracts the data.

Patent Document 1

Publication in Japan of translation of PCT International Patent Application: No. 2004-516743

FIG. 1A shows a configuration of a DQPSK receiver used in a conventional optical receiver device. This DQPSK receiver comprises an optical splitter 11, delay interferometers 12-1 and 12-2, photodiodes 13-1, 13-2, 13-3 and 13-4, transimpedance amplifiers (TIA) 14-1 and 14-2, limiting amplifiers (LIA) 15-1 and 15-2, a clock recovery circuit (CR) 16, decision circuits (DEC) 17-1 and 17-2 and a 2-to-1 multiplexer (MUX) 18.

Two optical signals split by the optical splitter 11 are respectively input into the delay interferometers 12-1 and 12-2. In these optical signals, as relative phase values with respect to the previous signal by one symbol, four phases of $\pi/4$, $3\pi/4$, $-\pi/4$ and $-3\pi/4$ are used.

The delay interferometer 12-1 splits the input optical signal into two signals, delays one optical signal by one symbol using a delay generator 21-1, gives a phase shift of $\pi/4$ to the other optical signal using a phase shifter 22. Then, the delay interferometer 12-1 extracts phase modulation components by causing the two optical signals from the delay generator 21-1 and the phase shifter 22 to interfere with each other, and outputs the extracted phase modulation components to the photodiodes 13-1 and 13-2.

The delay interferometer 12-2 splits the input optical signal into two signals, delays one optical signal by one symbol using a delay generator 21-2, gives a phase shift of $-\pi/4$ to the other optical signal using a phase shifter 23. Then, the delay interferometer 12-2 extracts phase modulation components by causing the two optical signals from the delay generator 21-2 and the phase shifter 23 to interfere with each other, and outputs the extracted phase modulation components to the photodiodes 13-3 and 13-4.

In the above manner, the two phase modulation components which are orthogonal to each other are extracted from the received optical signal by the delay interferometers 12-1 and 12-2, and the extracted phase modulation components are converted into variation of light intensity to be output.

The photodiodes 13-1 and 13-2 forms balanced photodiodes to convert the optical signals output from the delay interferometer 12-1 into an electric current by the photoelectric conversion and to output the electric current. The transimpedance amplifier 14-1 conducts a current-voltage conversion. The amplifier 15-1 amplifies the converted electric signal and outputs the amplified signal to the decision circuit 17-1 as the first data signal.

Similarly, the photodiodes 13-3 and 13-4 convert the optical signals output from the delay interferometer 12-2 into an electric current. The transimpedance amplifier 14-2 conducts a current-voltage conversion. The amplifier 15-2 amplifies the electric signal and outputs the amplified signal to the decision circuit 17-2 as the second data signal. In this manner, the received optical signal is detected and the data is extracted from the input signal.

The clock recovery circuit 16 extracts a clock signal from the first data signal input to the decision circuit 17-1, and distributes the signal to the decision circuits 17-1 and 17-2. The decision circuits 17-1 and 17-2 are configured by using for example D flip-flop circuits, respectively latches the first data signal and the second data signal in accordance with the extracted clock signals, and outputs the signals to the multiplexer 18. The multiplexer 18 multiplexes the two data signals from the decision circuits 17-1 and 17-2, and transfers the multiplexed signal to a deserializer (not shown) at a later stage.

For example, when quadrature signal Q and in-phase signal I as shown in FIG. 1B are respectively obtained as the first data signal and the second data signal, the multiplexer 18 multiplexes these signals in order to produce the original data string "ABCDEF . . . ".

When the in-phase signal I and the quadrature signal Q as shown in FIG. 1C are respectively obtained as the first data signal and the second data signal, the multiplexer 18 multiplexes these signals and produces a data string "BADCFE . . . ". However, the produced data string is different from the original data string "ABCDEF . . . ", accordingly, a bit swap function have to be provided in the multiplexer 18 or in a circuit (framer or the like) at a later stage for swapping adjacent data. In this case, the invention described in Japan Patent Application No. 2005-206467 can be utilized, which is a prior application.

FIG. 1D is a timing chart showing an example of input and output signals of the decision circuits 17-1 and 17-2. In this example, the signals input to the decision circuits 17-1 and 17-2 are latched by the rising edges of the clock signal and the output data signals are produced.

However, the above described conventional DQPSK receiver has problems as below.

As shown in FIG. 1A, the conventional DQPSK receiver employs a configuration in which two decision circuits 17-1 and 17-2 operates in accordance with the clock signal extracted by the single clock recovery circuit 16. The timing chart shown in FIG. 1D shows no differential delay between the data signals input to the decision circuits 17-1 and 17-2, however, a differential delay of $\Delta T$ actually occurs between the two input data signals as shown in FIG. 1E.

As shown in FIG. 1F, this differential delay of $\Delta T$ is equivalent to a difference of $|Ta-Tb|$ between the delay time Ta from the input terminal of the optical splitter 11 to the input terminal of the decision circuit 17-1 and the delay time Tb from the input terminal of the optical splitter 11 to the input terminal of the decision circuit 17-2. In the DQPSK receiver, the differential delay of $\Delta T$ is required to be sufficiently smaller than the input phase margin of the multiplexer 18.

The electric circuit and the delay interferometers 12-1 and 12-2 made of PLCs (Planar Lightwave Circuits) in the DQPSK receiver can be manufactured such that a physical length difference is equal to or smaller than 1 mm to 2 mm (about 10 ps). Accordingly, the differential delay there is equal to or smaller than the input phase margin (25 ps to 35 ps) of the multiplexer 18 in the case of employing the time slot of 20 Gb/s (50 ps).

However, in the case where there is a fiber interface between the optical splitter 11 and the delay interferometers 12-1/12-2 such as the case where the optical splitter 11 is provided as an external device, it is difficult to fabricate fibers exactly in the equal length if fusion splice is taken into consideration, which results in the difference of about 1 cm. The difference of 1 cm is equivalent to the differential delay of about 50 ps, and to the shift by one bit at the transmission rate of 20 Gb/s, which results in a serious problem and requires an initial adjustment.

In this case, almost the entirety of the differential delay ΔT consists of the difference between the delay time Ta1 from the input terminal of the optical splitter 11 to the input terminal of the delay interferometer 12-1 and the delay time Tb1 from the input terminal of the optical splitter 11 to the input terminal of the delay interferometer 12-2, i.e., |Ta1−Tb1|.

Further, the differential delay between the data signals output from the decision circuits 17-1 and 17-2 which are to be input to the multiplexer 18 has to be suppressed to a sufficiently small value such as about 10 ps to 15 ps compared to the phase margin.

In the invention described in Japan Patent Application No. 2005-245071 employs the configuration in which a delay amount of the data signals is adjusted using a variable delay circuit. However, manufacture of the conventional variable delay circuit which is commonly used supposes the use of CMOS (Complementary Metal Oxide Semiconductor), and the operation at 20 Gb/s cannot be realized by the current circuit technology. It is also thought that manufacture of the circuit having the same function with Silicon-Germanium is not practical in view of scale of the circuit and the electric power consumption.

SUMMARY OF THE INVENTION

It is an object of the present invention to reduce a differential delay between two data signals in a DQPSK receiver by a simpler configuration.

The optical receiver device according to the present invention comprises a first photoelectric conversion device, a second photoelectric conversion device, a clock recovery device, an inversion device, a first decision device and a second decision device, and receives an optical signal modulated in accordance with the differential quadrature phase shift keying.

The split device splits a received optical signal into two optical signals. The first photoelectric conversion device extracts a first phase modulation component from one of the two optical signals, and converts the first phase modulation component into a first data signal. The second photoelectric conversion device extracts a second phase modulation component from the other one of the two optical signals, and converts the second phase modulation component into a second data signal.

The clock recovery device extracts a clock signal from the first data signal or from the second data signal, and outputs the extracted clock signal. The inversion device produces an inverted clock signal by inverting the extracted clock signal, selects the extracted clock signal or the inverted clock signal, and outputs the selected clock signal. The first decision device latches the first data signal by using the clock signal output from the inversion device, and the second decision device latches the second data signal by using the extracted clock signal.

BRIEF DESCRIPTION OF THE DRAWINGS

FIG. 2 shows a principle of an optical receiver device according to the present invention;

FIG. 5A is a first timing chart of decision circuits at the second stage;

FIG. 12 shows the first to third manners of setting of the inversion circuit;

FIG. 13 is a timing chart which specifies a fourth manner of setting of the inversion circuit;

FIG. 15 is a timing chart which specifies a sixth manner of setting of the inversion circuit;

FIG. 16 is a timing chart which specifies a seventh manner of setting of the inversion circuit;

DESCRIPTION OF THE PREFERRED EMBODIMENT

Figure 1A:
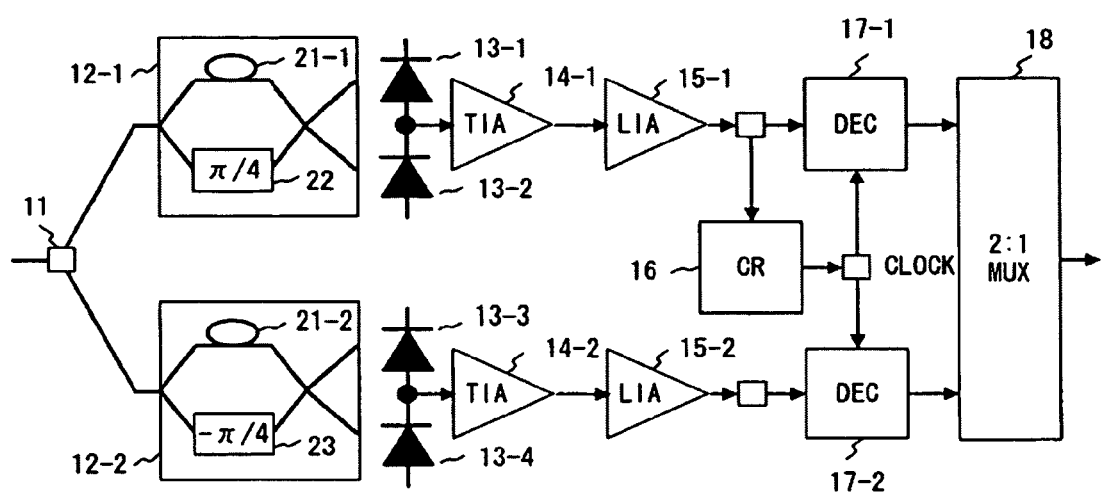
FIG. 1A shows a configuration of a conventional DQPSK receiver.
Figure 1B:
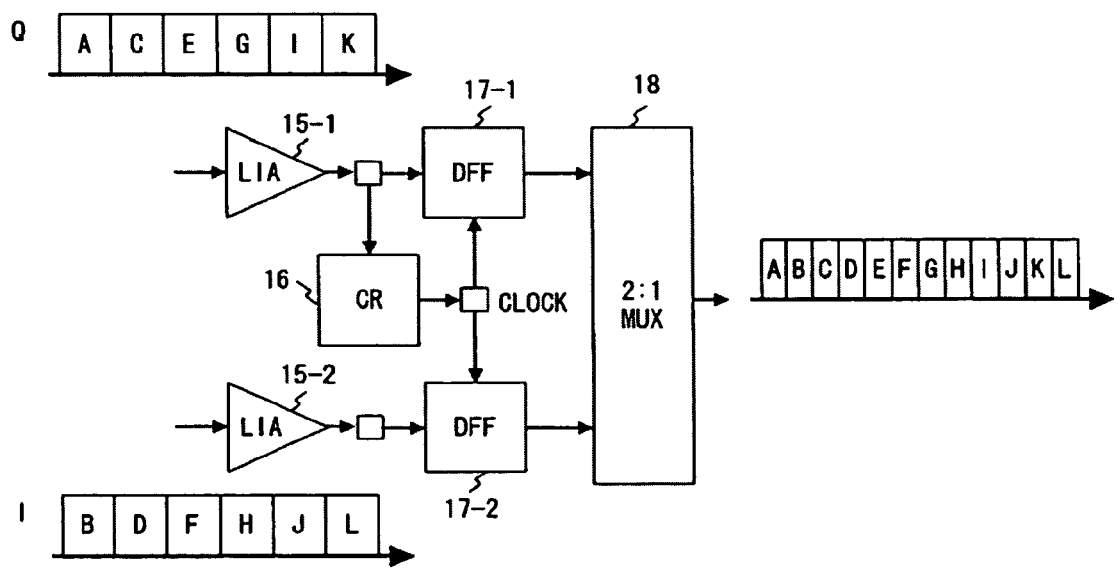
FIG. 1B shows operations of a first multiplexer.
Figure 1C:
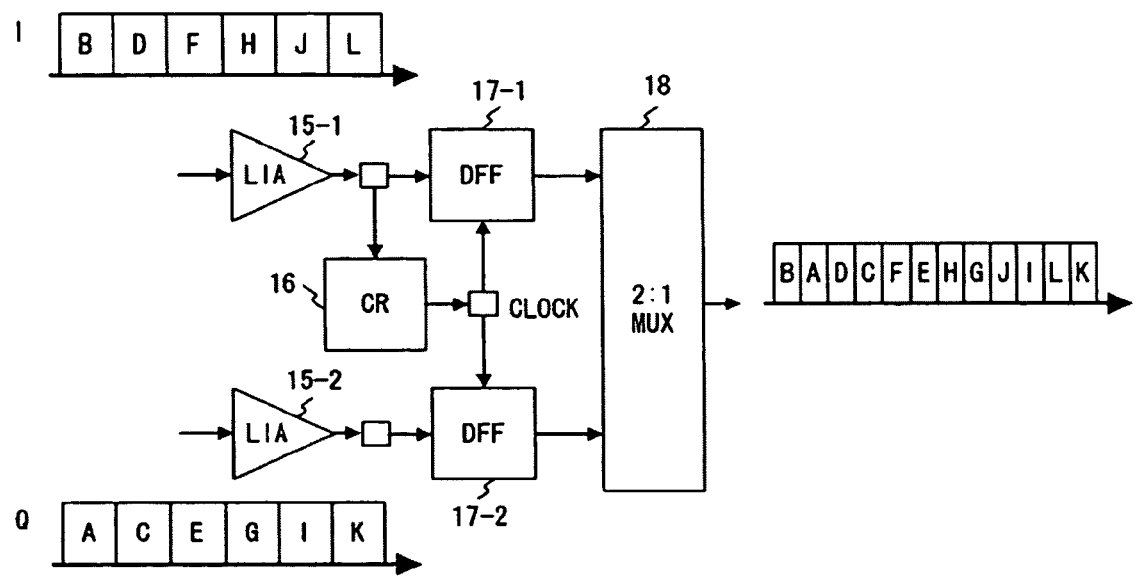
FIG. 1C shows operations of a second multiplexer.
Figure 1D:
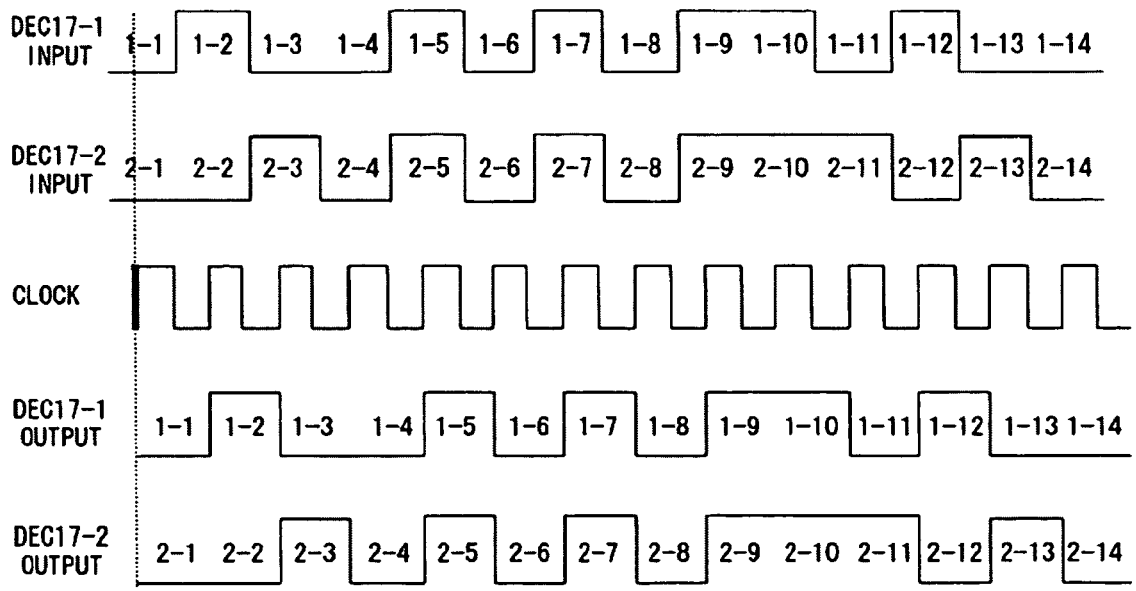
FIG. 1D is a timing chart of conventional decision circuits.
Figure 1E:
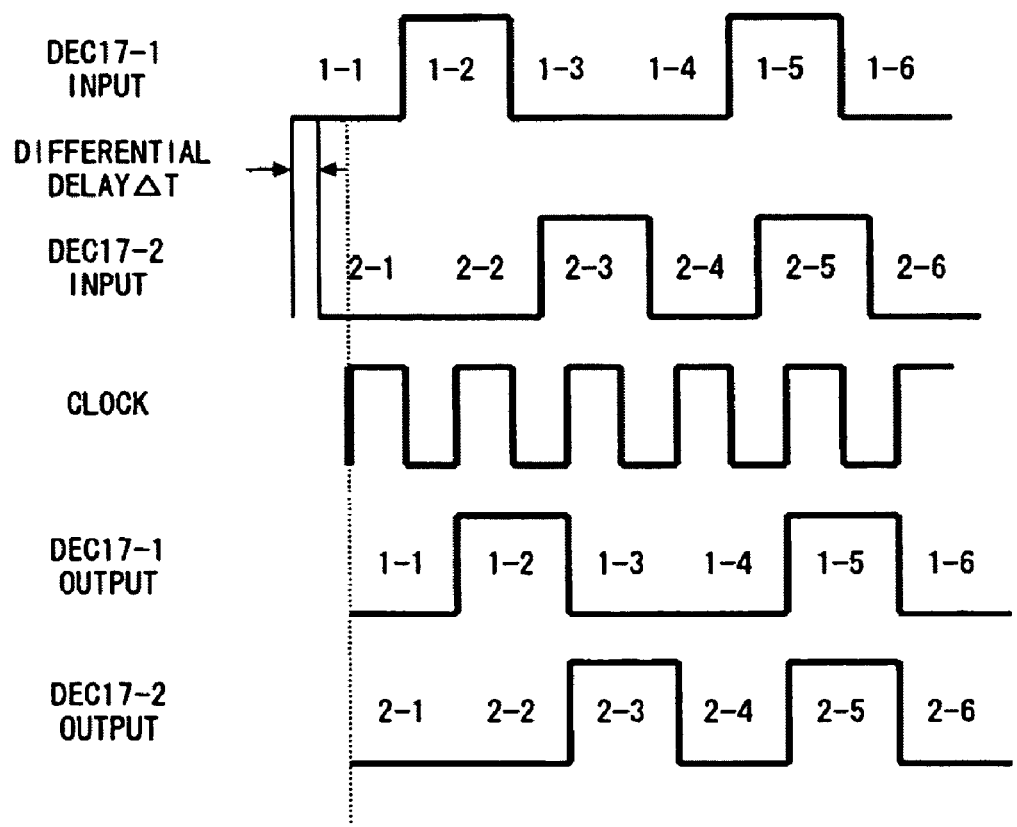
FIG. 1E shows a differential delay between two data signals.
Figure 1F:
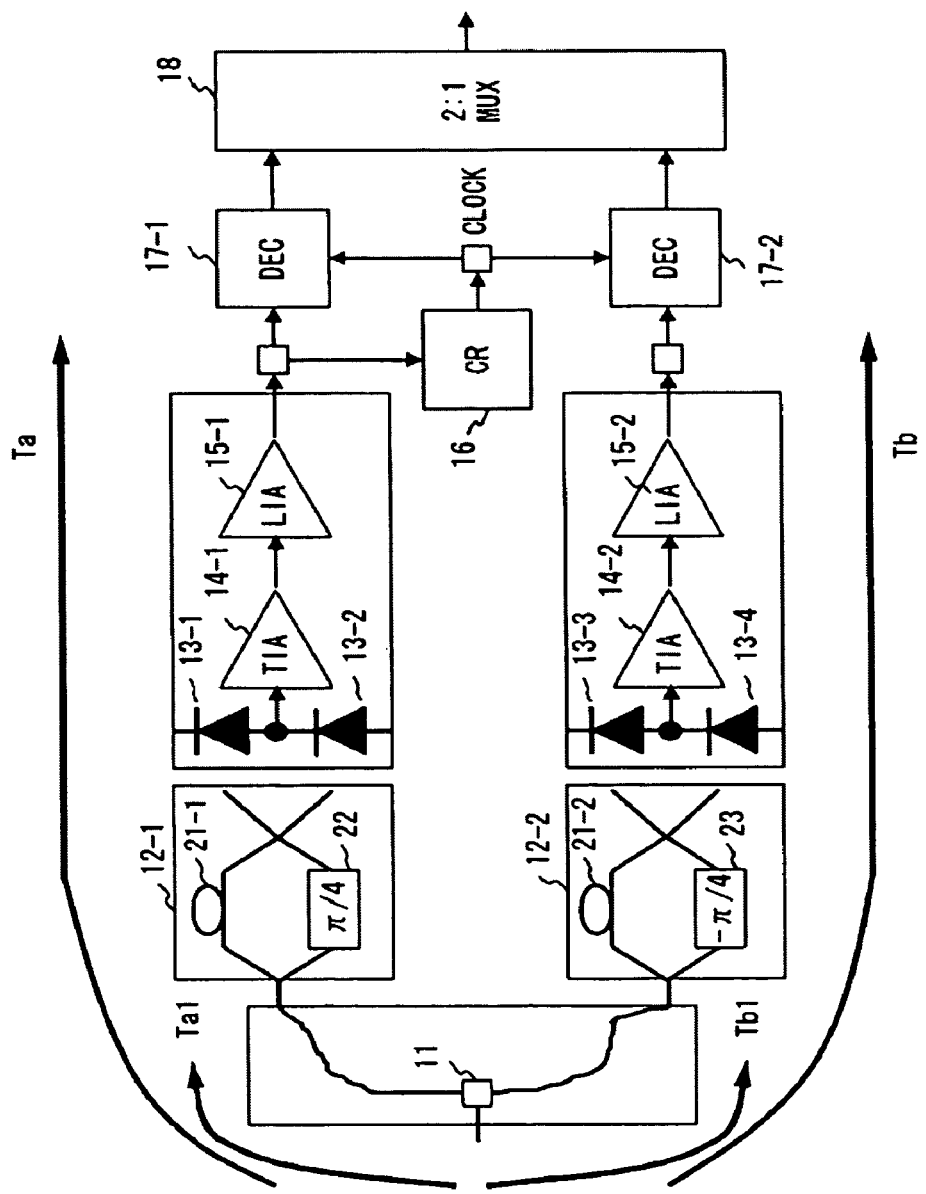
FIG. 1F shows delays of data signals.

Hereinafter, the preferred embodiments of the present invention will be explained in detail by referring to drawings.

FIG. 2 shows a principle of an optical receiver device according to the present invention. The optical receiver device in FIG. 2 comprises a split device 101, a first photoelectric conversion device 102, a second photoelectric conversion device 103, a clock recovery device 104, an inversion device 105, a first decision device 106 and a second decision device 107, and receives optical signals modulated in accordance with the differential quadrature phase shift keying.

The split device 101 splits a received optical signal into two optical signals. The first photoelectric conversion device 102 extracts a first phase modulation component from one of the two optical signals, and converts the first phase modulation component into a first data signal. The second photoelectric conversion device 103 extracts a second phase modulation component from the other one of the two optical signals, and converts the second phase modulation component into a second data signal.

The clock recovery device 104 extracts a clock signal from the first data signal or from the second data signal, and outputs the extracted clock signal. The inversion device 105 produces an inverted clock signal by inverting the extracted clock signal, selects the extracted clock signal or the inverted clock signal, and outputs the selected clock signal. The first decision device 106 latches the first data signal by using the clock signal output from the inversion device 105, and the second decision device 107 latches the second data signal by using the extracted clock signal.

The optical signals split by the split device 101 are input into the first photoelectric conversion device 102 and the second photoelectric conversion device 103. The first photoelectric conversion device 102 and the second photoelectric conversion device 103 respectively produce the first data signal and the second data signal based on respective phase modulation components different from each other included in the same optical signal, and respectively outputs the produced first data signal and the second data signal to the first decision device 106 and the second decision device 107.

The clock recovery device 104 extracts a clock signal from one of the above data signals, and outputs the extracted clock signal to the inversion device 105 and the second decision device 107. The inversion device 105 produces the inverted clock signal from the input extracted clock signal, selects one of the extracted clock signal and the inverted clock signal, and outputs the selected clock signal to the first decision device 106. The first decision device 106 and the second decision device 107 respectively latches the first data signal and the second data signal by using the input clock signals, and output to a multiplexer (not shown) at a later stage.

According to the above optical receiver device, when a prescribed differential delay occurs between the data signals input to the first decision device 106 and the second decision device 107, the inverted clock signal is selected as the output of the inversion device 105, thereby, the time at which the first decision device 106 latches the data signal can be shifted by ½ cycle. Thereby, the differential delay between the data signal output from the first decision device 106 and from the second decision device 107 is reduced by ½ cycle.

For example, in FIG. 3 and FIG. 6 which will be referred to later, the split device 101 corresponds to an optical splitter 201, the first photoelectric conversion device 102 corresponds to a delay interferometer 202-1, photodiodes 203-1 and 203-2 and amplifiers 204-1 and 205-1. The second photoelectric conversion device 103 corresponds to a delay interferometer 202-2, photodiodes 203-3 and 203-4 and amplifiers 204-2 and 205-2.

The clock recovery device 104, the inversion device 105, the first decision device 106 and the second decision device 107 respectively correspond to a clock recovery circuit 206, an inversion circuit 210-1 and decision circuits 207-1 and 207-2.

Figure 7:
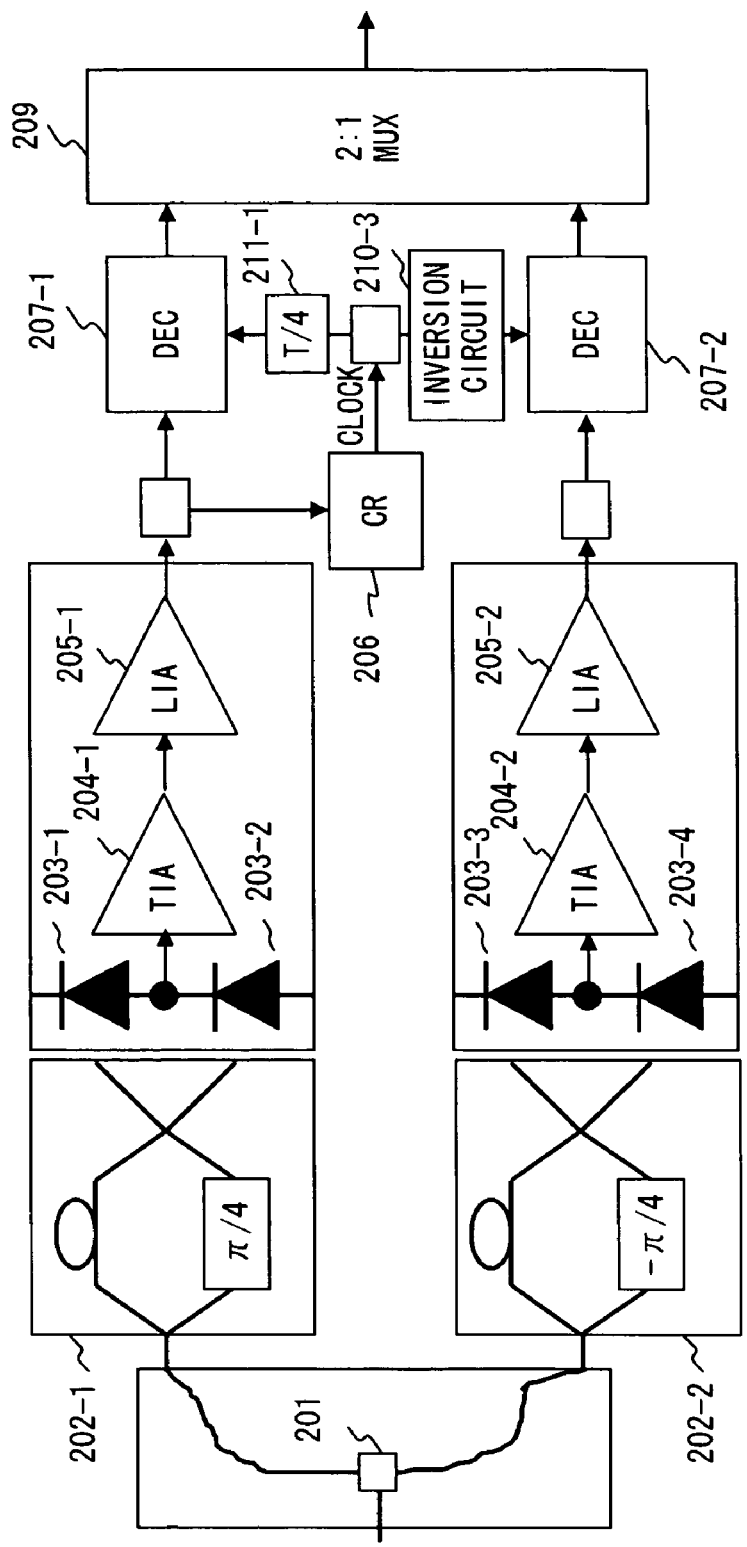
FIG. 7 shows a configuration of a third DQPSK receiver.

In FIG. 7 which will be referred to later, the split device 101 corresponds to the optical splitter 201. The first photoelectric conversion device 102 corresponds to the delay interferometer 202-2, the photodiodes 203-3 and 203-4 and the amplifiers 204-2 and 205-2. The second photoelectric conversion device 103 corresponds to the delay interferometer 202-1, photodiodes 203-1 and 203-2 and the amplifiers 204-1 and 205-1.

The clock recovery device 104, the inversion device 105, the first decision device 106 and the second decision device 107 respectively correspond to the clock recovery circuit 206, an inversion circuit 210-3 and decision circuits 207-2 and 207-1.

According to the present invention, in a DQPSK receiver, only by adding a circuit for inverting the clock signal extracted from the data signal, the differential delay between two data signals can be reduced. Accordingly, it is possible to dispense with a variable delay circuit for adjusting the differential delay.

Figure 3:
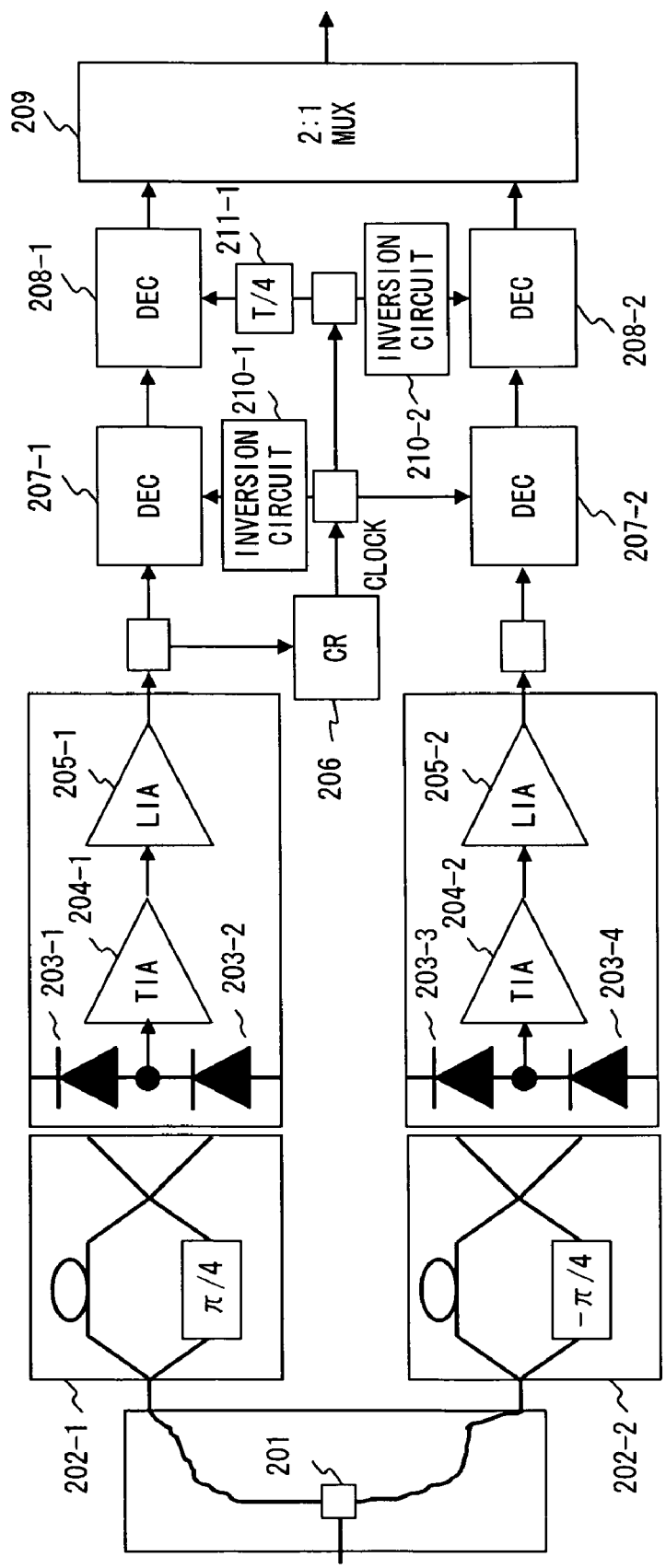
FIG. 3 shows a configuration of a first DQPSK receiver.

FIG. 3 shows an example of a configuration of a DQPSK receiver used in the optical receiver device in the embodiments of the present invention. This DQPSK receiver comprises the optical splitter 201, the delay interferometers 202-1 and 202-2, photodiodes 203-1, 203-2, 203-3 and 203-4, the transimpedance amplifiers (TIA) 204-1 and 204-2, the limiting amplifiers (LIA) 205-1 and 205-2, the clock recovery circuit (CR) 206, the decision circuits (DEC) 207-1, 207-2, 208-1 and 208-2, a 2-to-1 multiplexer (MUX) 209, the inversion circuits 210-1 and 210-2, and a clock delay circuit 211-1.

Among the above, operations of the optical splitter 201, the delay interferometers 202-1 and 202-2, photodiodes 203-1, 203-2, 203-3 and 203-4, the amplifiers 204-1 and 204-2, 205-1 and 205-2, the multiplexer 209 are similar to those of the previously described optical splitter 11, the delay interferometers 12-1 and 12-2, the photodiodes 13-1 and 13-2, 13-3 and 13-4, the amplifiers 14-1, 14-2, 15-1, 15-2 and the multiplexer 18.

The decision circuit blocks respectively in the later stages of the amplifiers 205-1 and 205-2 have two stages. The inversion circuit 210-1 is added to the decision circuit 207-1 at the first stage. The clock delay circuit 211-1 and the inversion circuit 210-2 are respectively added to the decision circuits 208-1 and 208-2 at the second stage. By this configuration, a fine adjustment is conducted so that the differential delay between two data signals input to the multiplexer 209 is equal to or less than ¼ of a time slot T.

The clock recovery circuit 206 extracts the clock signal from the first data signal input to the decision circuit 207-1, and distributes the extracted signal to the decision circuits 207-1, 207-2, 208-1 and 208-2. Upon this, the inversion circuit 210-1 produces the inverted clock signal by inverting the input clock signal, selects the input clock signal (normal clock signal) or the inverted clock signal, and outputs the selected clock signal to the decision circuit 207-1. Similarly, the inversion circuit 210-2 selects the input clock signal or the inverted clock signal, and outputs the selected clock signal to the decision circuit 208-2.

The clock delay circuit 211-1 delays the input clock signal by a value equivalent to T/4, and outputs the delayed clock signal to the decision circuit 208-1. This delay of T/4 is equivalent to 12.5 ps in a data signal of 20 Gb/s.

It is also possible that the receiver employs a configuration in which the clock recovery circuit 206 extracts a clock signal from the second data signal input to the decision circuit 207-2.

The decision circuits 207-1 and 207-2 are configured using for example D flip-flop circuits, respectively latches the first data signal and the second data signal in accordance with the clock signals output from the inversion circuit 210-1 and the clock recovery circuit 206, and respectively outputs the data signals to the decision circuits 208-1 and 208-2.

The decision circuits 208-1 and 208-2 are configured using for example D flip-flop circuits, respectively latches the first data signal and the second data signal in accordance with the clock signals output from the clock delay circuit 211-1 and the inversion circuit 210-2, and respectively outputs the data signals to the multiplexer 209.

A setting for determining which of the normal clock signal and the inverted clock signal is to be output as the outputs from the inversion circuits 210-1 and 210-2 is conducted when the DQPSK receiver is manufactured or when operation thereof starts. After the DQPSK receiver is manufactured, an optical pulse is input via an input terminal of the optical splitter 201, and a differential delay between two data signals is measured. Then, the clock signals to be output from the inversion circuits 210-1 and 210-2 are selected and set.

As a point at which the measurement is to be conducted, output terminals of the delay interferometers 202-1 and 202-2, or the input terminals of the multiplexer 209 can be selected for example. It is desirable to select the input terminals of the multiplexer 209 as the measurement points if more accurate measurement of the differential delay is desired.

Next, operations of the decision circuits 207-1, 207-2, 208-1 and 208-2 in FIG. 3 will be explained more specifically by referring to FIG. 4 to FIG. 5B.

Figure 4:
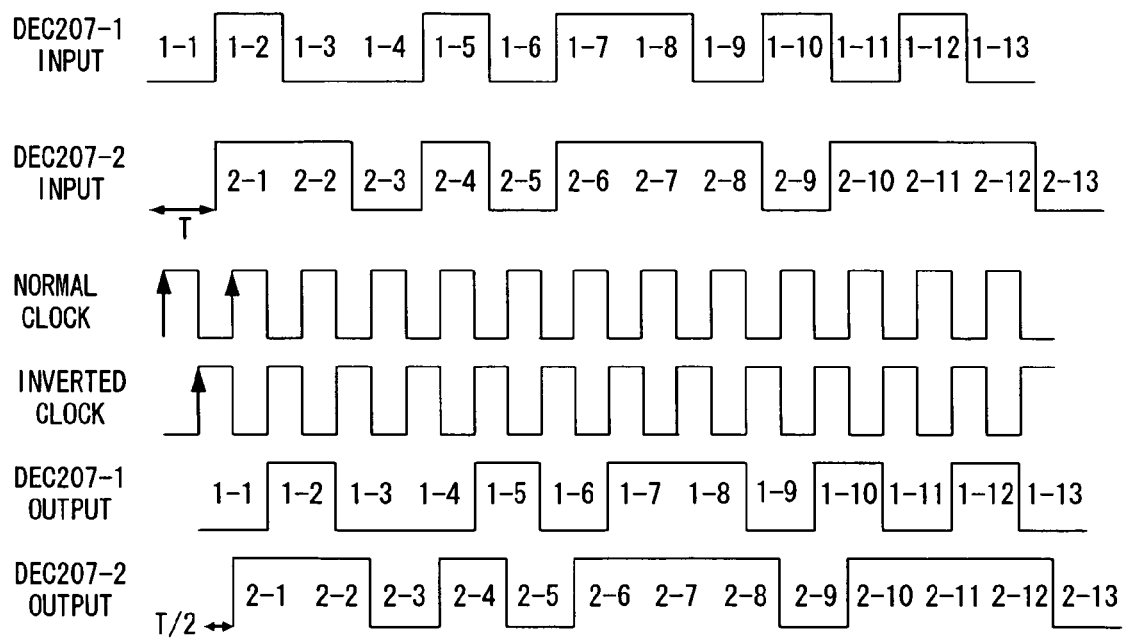
FIG. 4 is a timing chart of decision circuits at the first stage.

FIG. 4 is a timing chart showing an example of delay adjustment by the decision circuits 207-1 and 207-2 at the first stage. In this example, the output from the inversion circuit 210-1 is set to the inverted clock signal.

The data signal input to the decision circuit 207-2 has a delay of about one time slot (T) to the data signal input to the decision circuit 207-1, however, these signals are respectively latched by the rising edges of the normal clock signal and the inverted clock signal, so that the differential delay between the output data signals is reduced to about T/2.

FIG. 5A is a timing chart showing an example of a delay adjustment by the decision circuits 208-1 and 208-2 at the second stage. In this example, the output from the inversion circuit 210-2 is set to the inverted clock signal.

The data signal input to the decision circuit 208-2 has a delay of about T/2 to the data signal input to the decision circuit 208-1, however, these signals are respectively latched by the rising edges of the inverted clock signal and the normal clock signal which is delayed by T/4, so that the differential delay between the output data signals is reduced to about T/4.

Figure 5B:
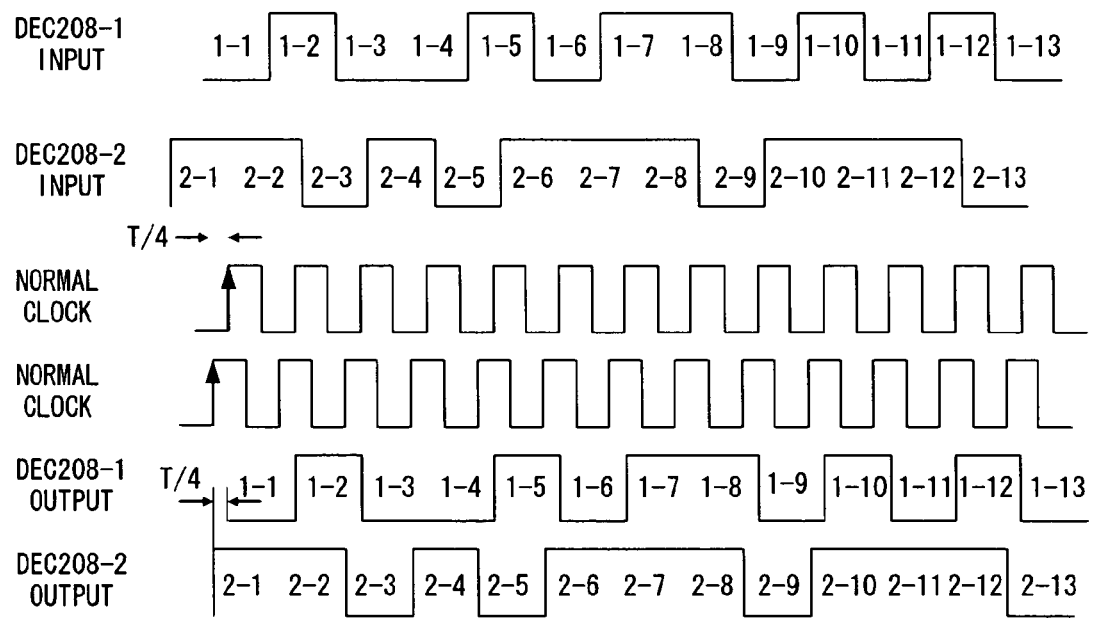
FIG. 5B is a second timing chart of the decision circuits at the second stage.

FIG. 5B, different from FIG. 5A, is a timing chart in the case where the data signal input to the decision circuit 208-1 has a delay to the data signal input to the decision circuit 208-2. In this example, the output from the inversion circuit 210-2 is set to the normal clock signal.

The data signal input to the decision circuit 208-1 has a delay of about T/2 to the data signal input to the decision circuit 208-2, however, these signals are respectively latched by the rising edges of the normal clock signal which is delayed by T/4 and the normal clock signal, so that the differential delay between the output data signals is reduced to about T/4.

As above, by the combination of the inversion circuits 210-1/210-2, and clock delay circuit 211-1, the differential delay at the input terminals of the multiplexer 209 can be reduced to T/4 (12.5 ps in the case of 20 Gb/s) so that sufficiently practical differential delay is realized.

According to the above configuration, compared to the conventional DQPSK receiver, delay adjustment can be implemented only by adding the decision circuits 208-1 and 208-2 at the second stage, the inversion circuits 210-1 and 210-2 and the clock delay circuit 211-1.

The addition of a decision circuit alone has a small influence on a scale of the circuit, and does not have an influence on the high frequency characteristic. Also, the clock delay circuit 211-1 can be implemented simply by wiring on the board. In this case, the delay line which is as short as about 2 mm (in the case of 20 Gb/s) is only necessary. The influence on the implementation size is also small. The insertion loss is equal to or less than 0.1 dB, which is a negligible value.

Additionally, the increase of the differential delay caused by the difference in bit rates of 40 Gb/s to 46 Gb/s is about 1.5 ps, and the phase margin at the input terminal of the multiplexer 209 can sufficiently absorb this increase. Accordingly, the configuration of the present invention is not confronted by a problem with respect to responding to multi rate processing which takes transmission of error code into consideration.

Additionally, the inversion circuit 210-1 can be arranged on the decision circuit 207-2 side, and the positions of the inversion circuit 210-2 and the clock delay circuit 211-1 can be changed to each other. Also, the two-stage configuration of the decision circuit blocks in the DQPSK receiver in FIG. 3 can be changed to a one-stage configuration.

Figure 6:
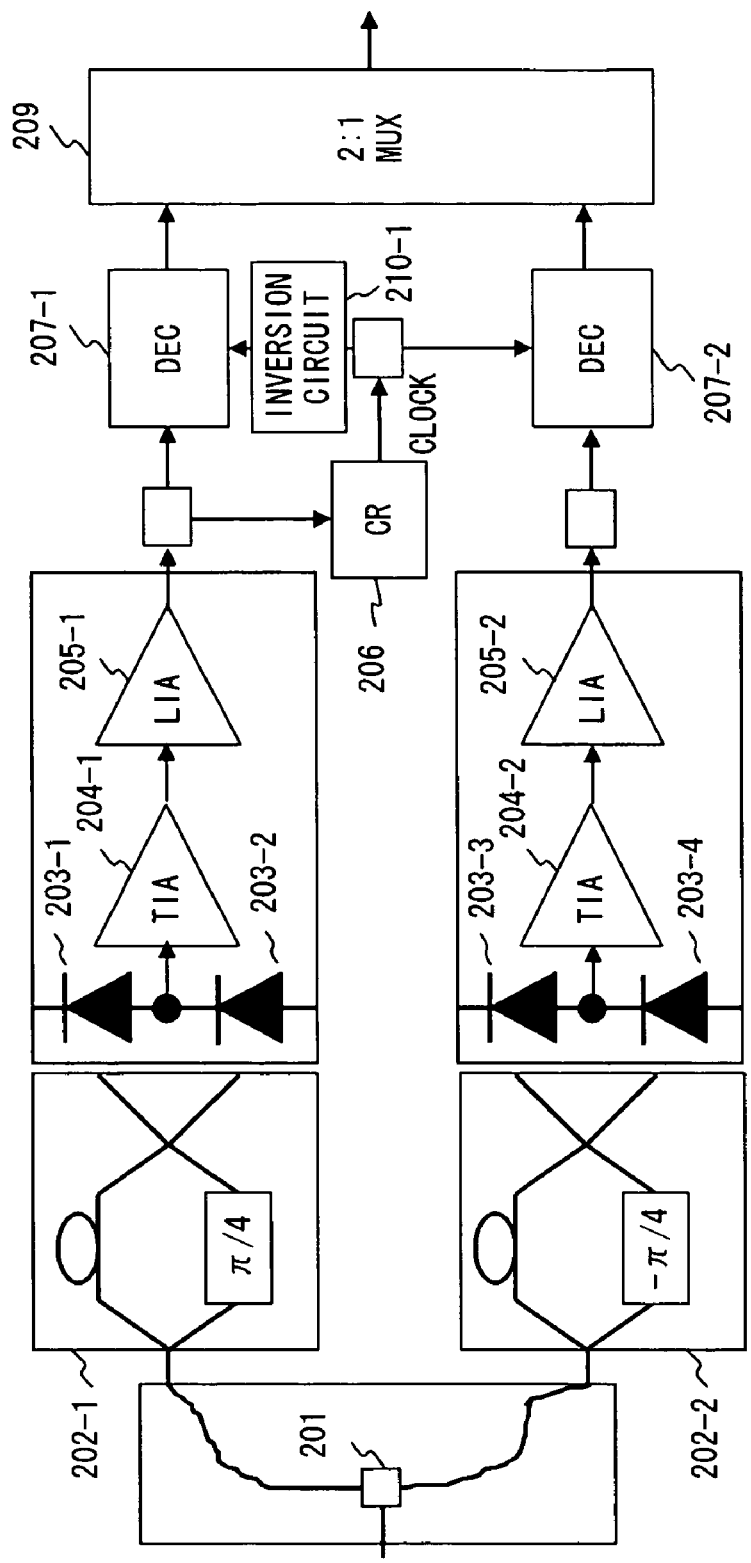
FIG. 6 shows a configuration of a second DQPSK receiver.

FIG. 6 shows an example of a configuration of the DQPSK receiver having such a one-stage configuration. This DQPSK receiver has a configuration made by removing the decision circuits 208-1 and 208-2, the inversion circuit 210-2 and the clock delay circuit 211-1 from the configuration in FIG. 3. In this case, the decision circuits 207-1 and 207-2 directly output the latched data signals to the multiplexer 209.

According to the above configuration, the differential delay at the input terminals of the multiplexer 209 can be reduced to T/2 (25 ps in the case of 20 Gb/s). The inversion circuit 210-1 can be arranged on the decision circuit 207-2 side.

FIG. 7 shows an example of a configuration of another DQPSK receiver. This DQPSK receiver has a configuration made by removing the decision circuits 208-1 and 208-2, the inversion circuit 210-2 and the clock delay circuit 211-1 and adding the inversion circuit 210-3 and a clock delay circuit 211-2 from/to the configuration in FIG. 3.

In this case, the inversion circuit 210-3 selects the clock signal output from the clock recovery circuit 206 or the inverted clock signal, and outputs the selected clock signal to the decision circuit 207-2. The clock delay circuit 211-2 delays the clock signal output from the clock recovery circuit 206 by T/4, and outputs the delayed clock signal to the decision circuit 207-1. The decision circuits 207-1 and 207-2 directly outputs the data signal latched in accordance with the input clock signals to the multiplexer 209.

According to the above configuration, the differential delay at the input terminals of the multiplexer 209 can be reduced to T/4. The positions of the inversion circuit 210-3 and the clock delay circuit 211-2 can be changed to each other.

Figure 8:
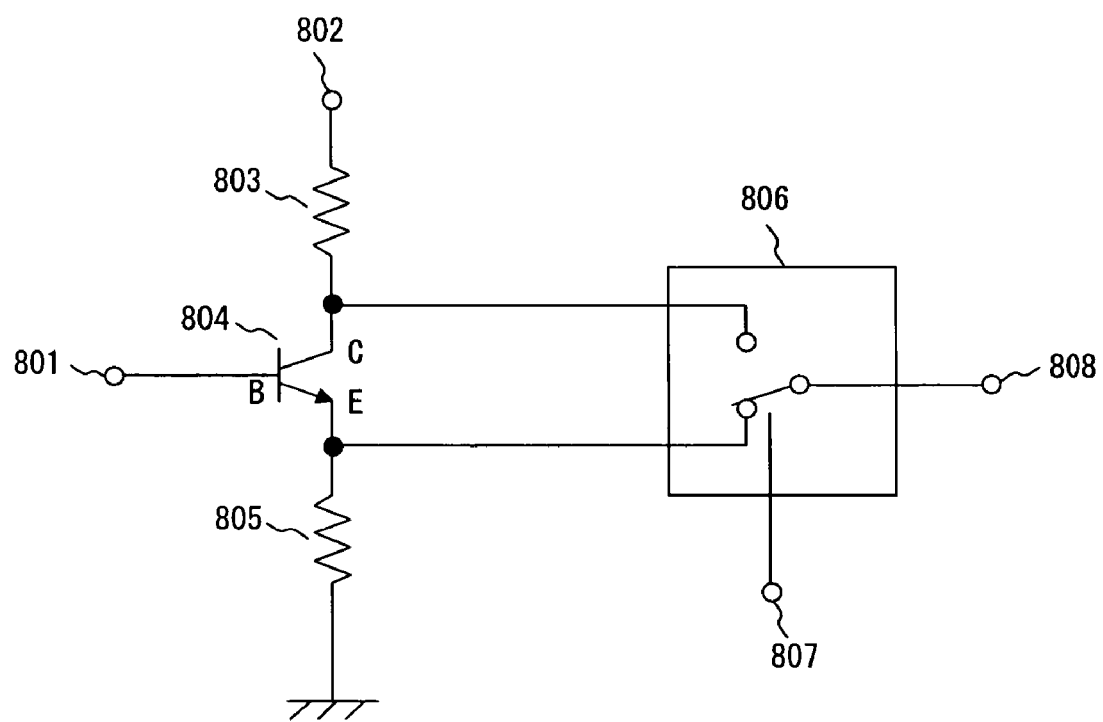
FIG. 8 shows a configuration of an inversion circuit.

FIG. 8 shows an example of a configuration of the above inversion circuits 210-1 to 210-3. The inversion circuit in FIG. 8 comprises resistors 803 and 805, a transistor 804 and a switch 806. The base (B) of the transistor 804 is connected to an input terminal 801, the collector (C) is connected to a power source terminal 802 via the resistor 803, and the emitter (E) is connected to ground potential via the resistor 805. The resistors 803 and 805 have the same resistance value.

The clock signal input via the input terminal 801 is output from the emitter of the transistor 804 in the same polarity, and is output from the collector in the opposite polarity. The switch 806 selects the clock signal from the emitter or the clock signal from the collector in accordance with the value of the control signal input from a control terminal 807, and outputs the selected clock signal to an output terminal 808. Accordingly, by operating the switch 806 in accordance with the measured differential delay, the output clock signal can be selected and set.

Next, manners of setting the inversion circuits in FIG. 3, FIG. 6 and FIG. 7 will be explained by referring to FIG. 9 to FIG. 18.

Figure 9:
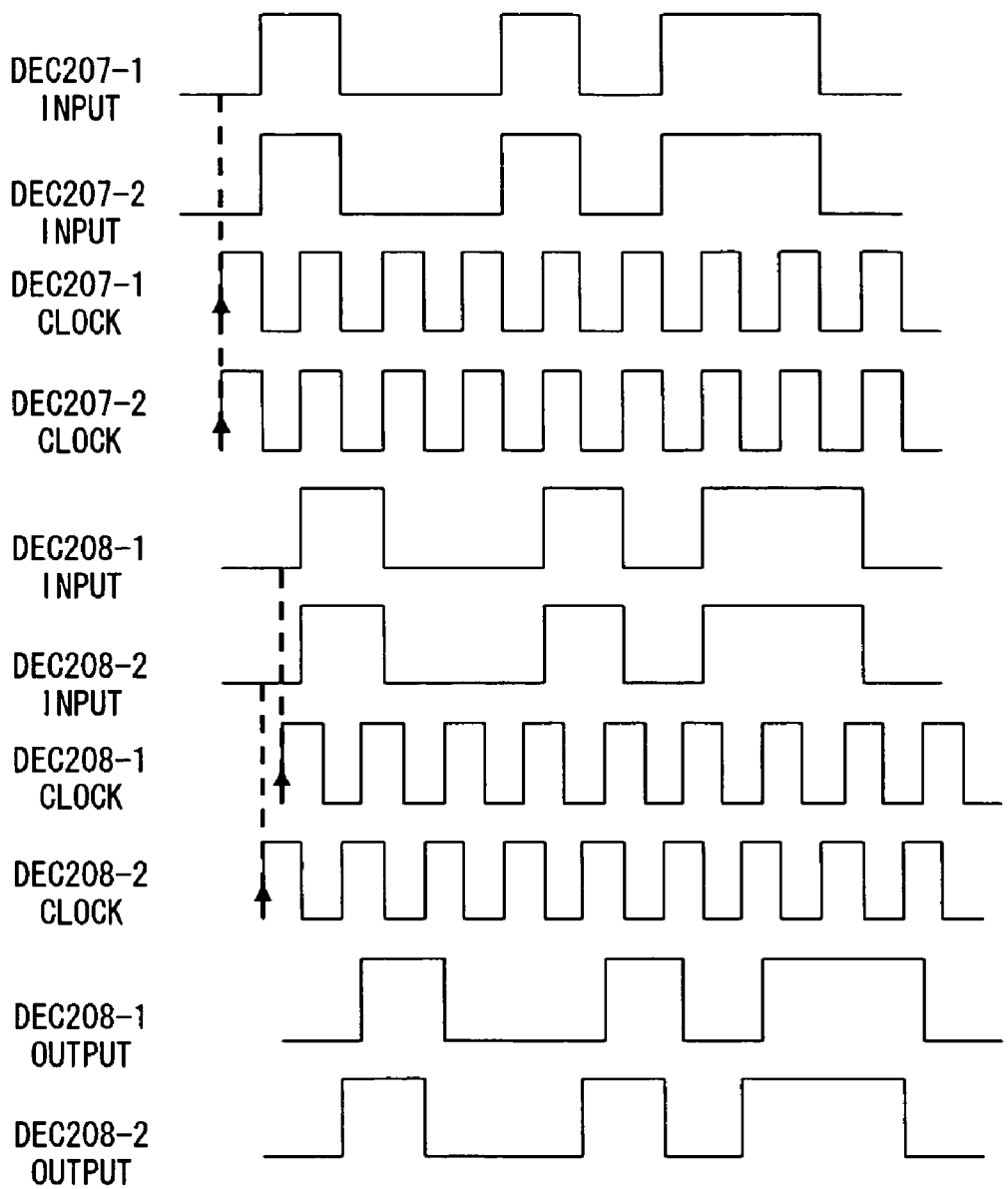
FIG. 9 is a timing chart which specifies a first manner of setting of the inversion circuit.

In the DQPSK receiver in FIG. 3, the timing chart shown in FIG. 9 is employed in the case where there is not a differential delay between the data signals input to the decision circuits 207-1 and 207-2. In this case, the outputs from the inversion circuits 210-1 and 210-2 are both set to the normal clock signals. Accordingly, the same clock signal is input to the decision circuits 207-1 and 207-2, and the clock signals with the differential delay of T/4 are input to the decision circuits 208-1 and 208-2.

Accordingly, the data signals input to the decision circuits 208-1 and 208-2 are in phase, and the data signal output from the decision circuit 208-1 is delayed by T/4 to the data signal output from the decision circuit 208-2. However, this will not cause any problem in the circuits at later stages because the above differential delay between these data signals is within a range of input phase margin to the multiplexer 209.

Figure 10:
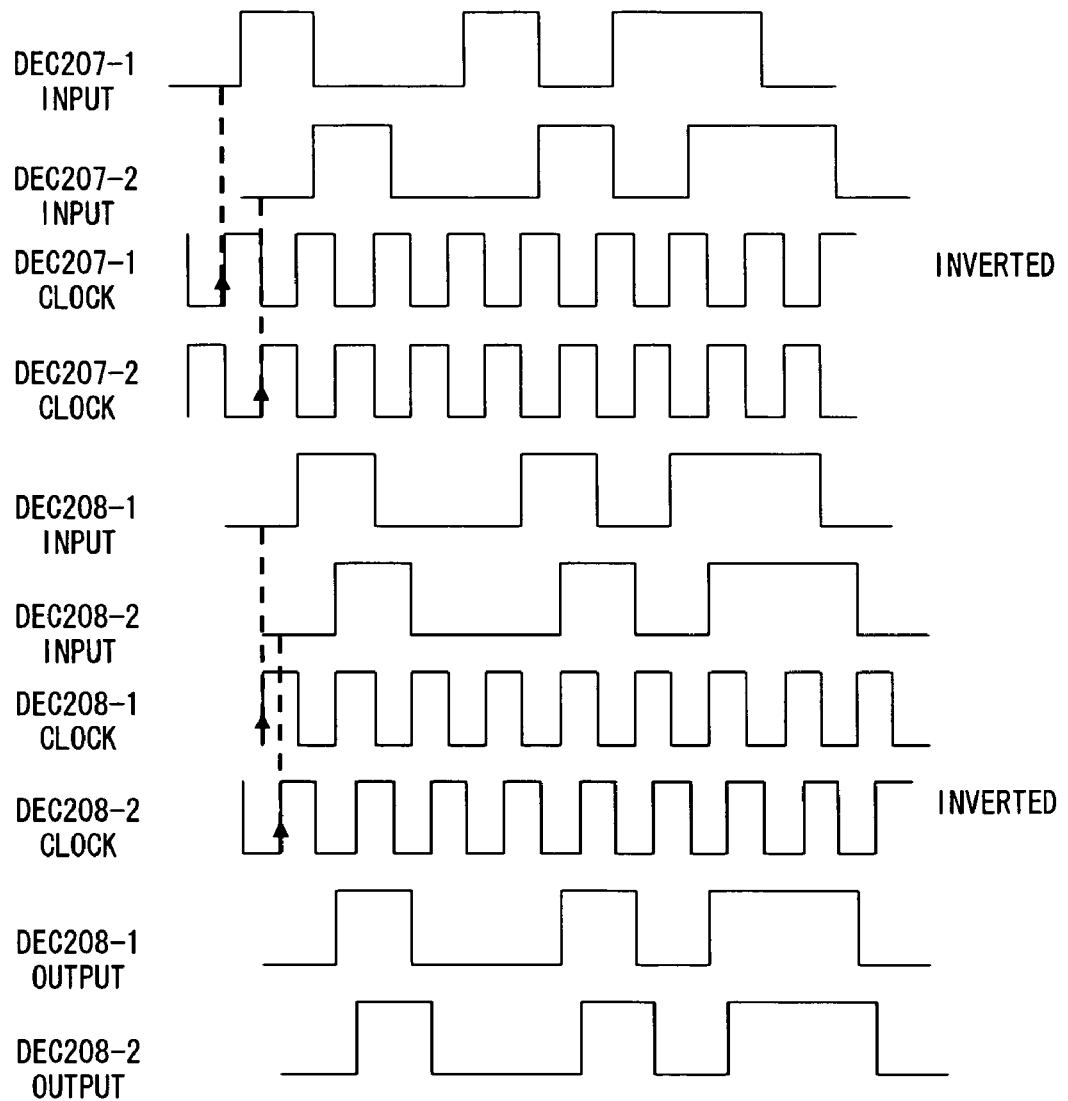
FIG. 10 is a timing chart which specifies a second manner of setting of the inversion circuit.

The timing chart shown in FIG. 10 is employed in the case where the data signal input to the decision circuit 207-2 has a delay of T to the data signal input to the decision circuit 207-1. In this case, the outputs from the inversion circuits 210-1 and 210-2 are both set to the inverted clock signals. Accordingly, the clock signals with the differential delay of T/2 are input to the decision circuits 207-1 and 207-2, and the clock signals with the differential delay of T/4 are input to the decision circuits 208-1 and 208-2. Therefore, the differential delay between the data signals input to the decision circuits 208-1 and 208-2 is reduced to T/2, and further, the differential delay between the output data signals is reduced to T/4.

Figure 11:
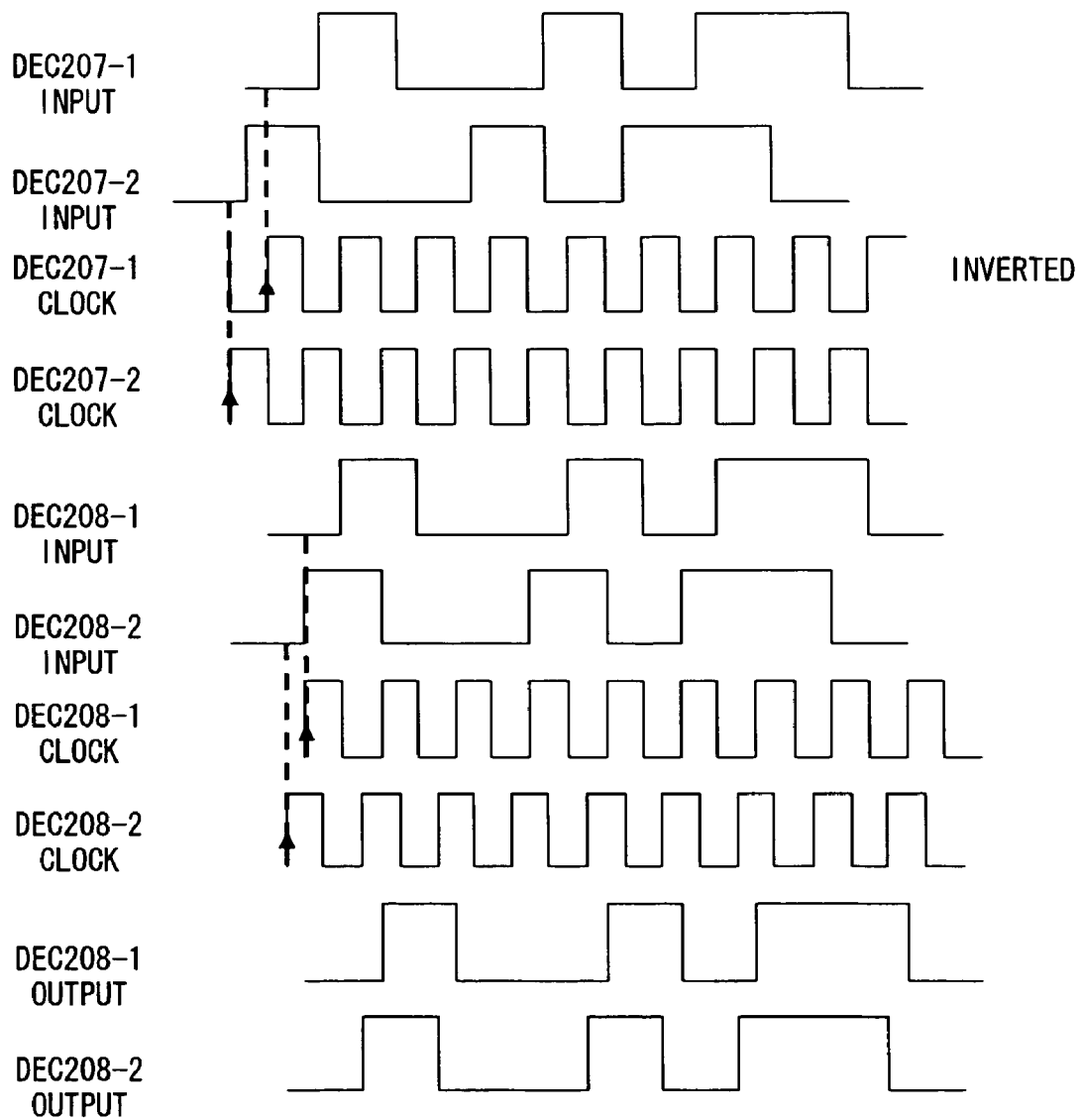
FIG. 11 is a timing chart which specifies a third manner of setting of the inversion circuit.

The timing chart shown in FIG. 11 is employed in the case where the data signal input to the decision circuit 207-1 has a delay of T to the data signal input to the decision circuit 207-2. In this case, the outputs from the inversion circuits 210-1 and 210-2 are respectively set to the inverted clock signal and the normal clock signal. Accordingly, the clock signals with the differential delay of T/2 are input to the decision circuits 207-1 and 207-2, and the clock signals with the differential delay of T/4 are input to the decision circuits 208-1 and 208-2. Therefore, the differential delay between the data signals input to the decision circuits 208-1 and 208-2 is reduced to T/2, and further, the differential delay between the output data signals is reduced to T/4.

The manners of setting the inversion circuits 210-1 and 210-2 in the above three cases are shown in FIG. 12.

In the DQPSK receiver in FIG. 6, the timing chart shown in FIG. 13 is employed in the case where there is not a differential delay between the data signals input to the decision circuits 207-1 and 207-2. In this case, the output from the inversion circuit 210-1 is set to the normal clock signal. Accordingly, the same clock signal is input to the decision circuits 207-1 and 207-2, and the data signals output from the decision circuits 207-1 and 207-2 are in phase.

Figure 14:
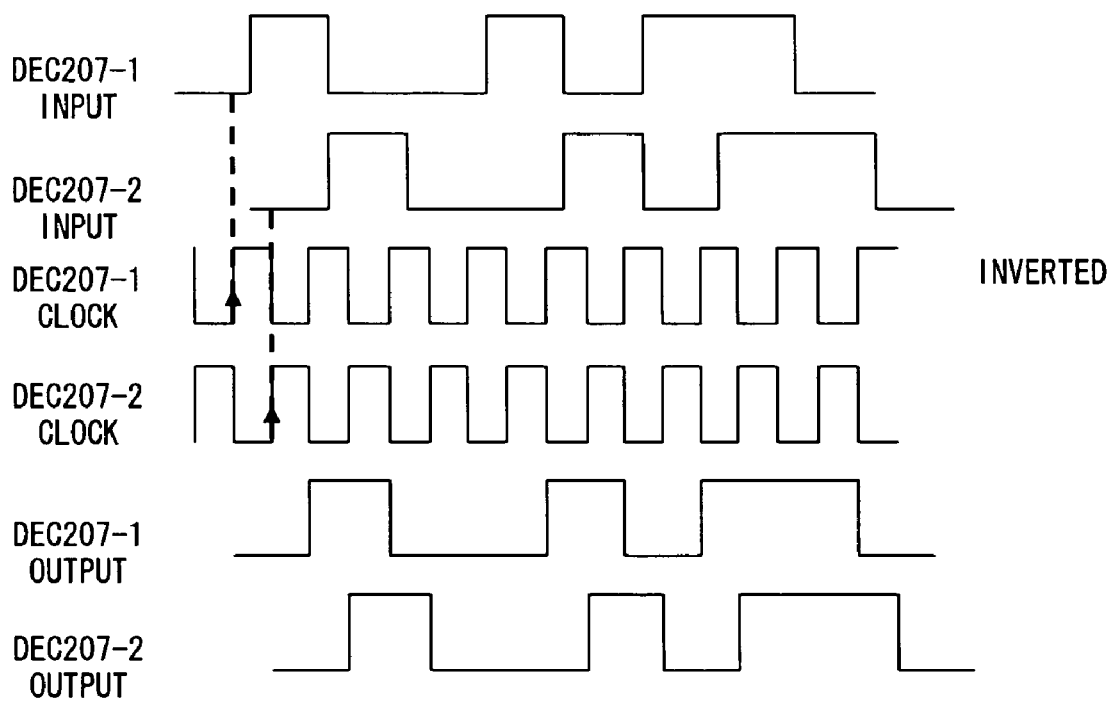
FIG. 14 is a timing chart which specifies a fifth manner of setting of the inversion circuit.

The timing chart shown in FIG. 14 is employed in the case where the data signal input to the decision circuit 207-2 has a delay of T to the data signal input to the decision circuit 207-1. In this case, the output from the inversion circuit 210-1 is set to the inverted clock signal. Accordingly, the clock signals with the differential delay of T/2 are input to the decision circuits 207-1 and 207-2, and the differential delay between the output data signals is reduced to T/2.

The timing chart shown in FIG. 15 is employed in the case where the data signal input to the decision circuit 207-1 has a delay of T to the data signal input to the decision circuit 207-2. In this case, the output from the inversion circuit 210-1 is set to the inverted clock signal. Accordingly, the clock signals with the differential delay of T/2 are input to the decision circuits 207-1 and 207-2, and the differential delay between the output data signals is reduced to T/2.

In the DQPSK receiver in FIG. 7, the timing chart shown in FIG. 16 is employed in the case where there is not a differential delay between the data signals input to the decision circuits 207-1 and 207-2. In this case, the output from the inversion circuit 210-3 is set to the normal clock signal. Accordingly, the clock signals with the differential delay of T/4 are input to the decision circuits 207-1 and 207-2, and the data signal output from the decision circuit 207-1 is delayed by T/4 to the data signal output from the decision circuit 207-2. However, this differential delay between the data signals will not cause any problem in the circuits at later stages.

Figure 17:
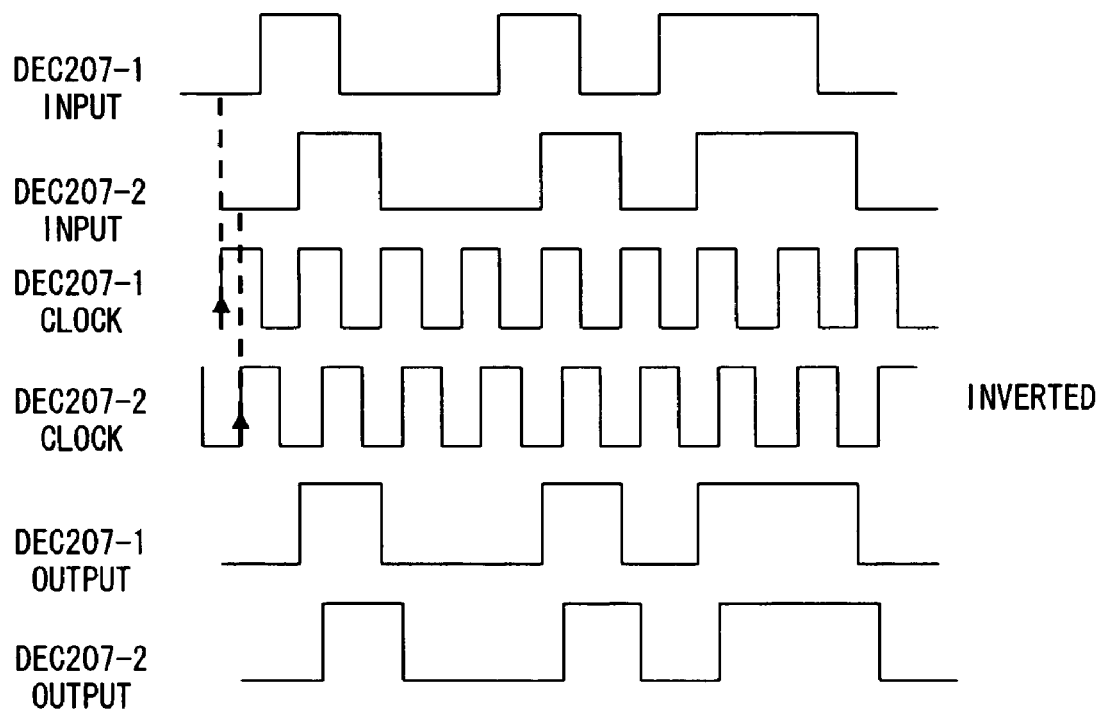
FIG. 17 is a timing chart which specifies an eighth manner of setting of the inversion circuit.

The timing chart shown in FIG. 17 is employed in the case where the data signal input to the decision circuit 207-2 has a delay of T/2 to the data signal input to the decision circuit 207-1. In this case, the output from the inversion circuit 210-3 is set to the inverted clock signal. Accordingly, the clock signals with the differential delay of T/4 are input to the decision circuits 207-1 and 207-2, and the differential delay between the output data signals is reduced to T/4.

Figure 18:
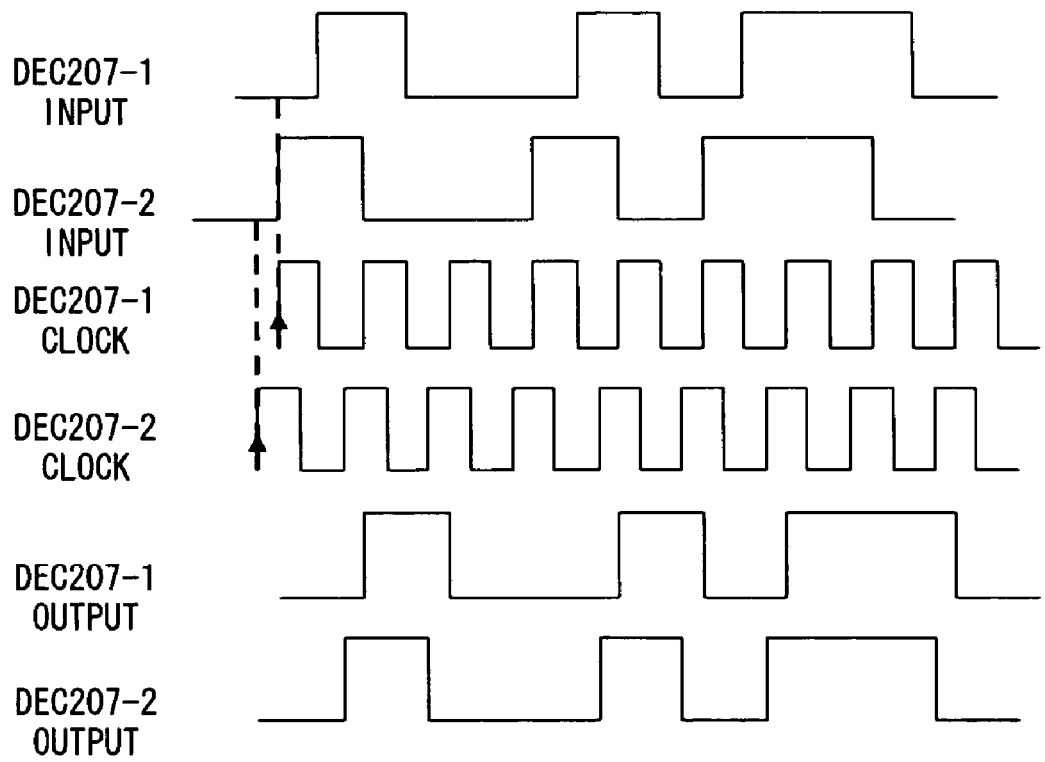
FIG. 18 is a timing chart which specifies a ninth manner of setting of the inversion circuit.

The timing chart shown in FIG. 18 is employed in the case where the data signal input to the decision circuit 207-1 has a delay of T/2 to the data signal input to the decision circuit 207-2. In this case, the output from the inversion circuit 210-3 is set to the normal clock signal. Accordingly, the clock signals with the differential delay of T/4 are input to the decision circuits 207-1 and 207-2, and the differential delay between the output data signals is reduced to T/4.

In the DQPSK receiver shown in FIG. 3 employs the configuration in which combinations of the transimpedance amplifiers (TIA) and the limiting amplifiers (LIA) are adopted as the amplifier circuits to be arranged between the photodiodes and the decision circuits. However, other configurations are possible. The functions of these amplifier circuits are as below.

(1) Amplifying a small signal to amplitude which can be sufficiently decided by a decision circuit
(2) Suppressing the maximum amplitude to amplitude which can be sufficiently decided by a decision circuit Accordingly, if the outputs from the photodiodes are not higher than a prescribed value, the LIAs are not necessary. If the outputs from the photodiodes are sufficiently high, both of the TIAs and the LIAs can be dispensed with just by terminating the outputs from the photodiodes with 50 Ω. Also, an automatic gain control circuit (AGC) can be employed instead of the LIA.

Figure 19:
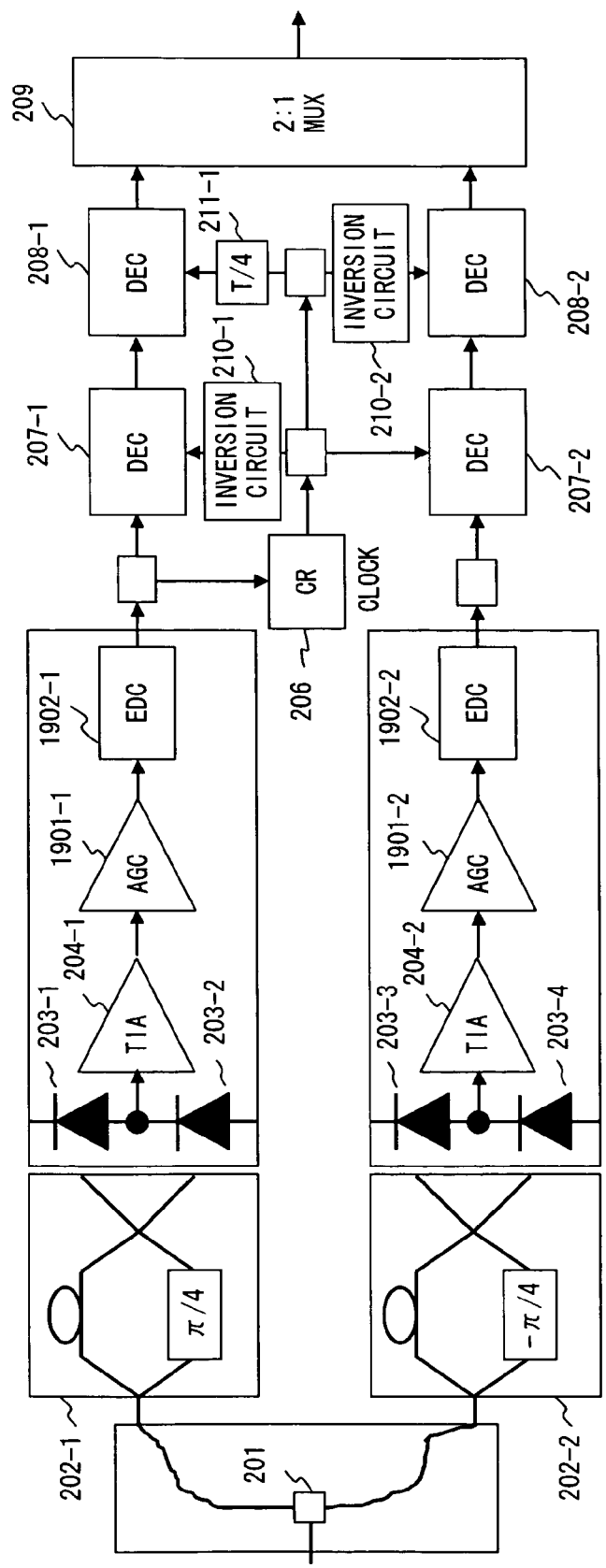
FIG. 19 shows a configuration of a fourth DQPSK receiver.

For example, in the case where the AGCs replace the amplifiers 205-1 and 205-2 in FIG. 3, the DQPSK receiver employs the configuration shown in FIG. 19. In this example, an automatic gain control circuit 1901-1 and an electronic dispersion compensator (EDC) 1902-1 are arranged between the amplifier 204-1 and the decision circuit 207-1, and an automatic gain control circuit 1901-2 and an electronic dispersion compensator 1902-2 are arranged between the amplifier 204-2 and the decision circuit 207-2. According to this configuration, the electronic dispersion compensation can be performed by adjusting the gain while maintaining the waveform using the automatic gain control circuits 1901-1 and 1901-2.

Additionally, the same alternation can be adopted on the amplifier circuits in the DQPSK receivers shown in FIG. 6 and FIG. 7.

In the embodiments explained above, the delay amount of the clock delay circuits 211-1 and 211-2 is T/4, however, other values which are predetermined can be used as the delay amount.

What is claimed is:

1. An optical receiver device for receiving an optical signal modulated using differential quadrature phase shift keying, the optical receiver device comprising:
   a split device to split a received optical signal into two optical signals;
   a first photoelectric conversion device to extract a first phase modulation component from one of the two optical signals, and to convert the first phase modulation component into a first data signal;

a second photoelectric conversion device to extract a second phase modulation component from the other one of the two optical signals, and to convert the second chase modulation component into a second data signal;

a clock recovery device to extract a clock signal from one of the first data signal and the second data signal, and to output an extracted clock signal;

an inversion device to generate an inverted clock signal by inverting the extracted clock signal, to select one of the extracted clock signal and the inverted clock signal depending on a differential delay between the first data signal and the second data signal, and to output the selected clock signal;

a delay device to delay the extracted clock signal by a delay amount equivalent to ¼ of a time slot of one of the first data signal and the second data signal, and to output a delayed clock signal;

a first decision device to latch the first data signal by using the clock signal output from the inversion device; and a second decision device to latch the second data signal by using the delayed clock signal, wherein:

the inversion device selects and outputs one of the extracted clock signal and the inverted clock signal according to a control signal and selects and outputs the extracted clock signal when there is not a differential delay between the first data signal and the second data signal and when the second data signal has a delay amount equivalent to ½ of a time slot to the first data signal, and the inverted clock signal when the first data signal has a delay amount equivalent to ½ of a time slot to the second data signal.

2. An optical receiver device for receiving an optical signal modulated using differential quadrature phase shift keying, the optical receiver device comprising:

a split device to split a received optical signal into two optical signals;

a first photoelectric conversion device to extract a first phase modulation component from one of the two optical signals, and to convert the first phase modulation component into a first data signal;

a second photoelectric conversion device to extract a second phase modulation component from the other one of the two optical signals, and to convert the second phase modulation component into a second data signal;

a clock recovery device to extract a clock signal from one of the first data signal and the second data signal, and to output an extracted clock signal;

an inversion device to generate an inverted clock signal by inverting the extracted clock signal, to select one of the extracted clock signal and the inverted clock signal depending on a differential delay between the first data signal and the second data signal, and to output the selected clock signal;

a first decision device to latch the first data signal by using the clock signal output from the inversion device;

a second decision device to latch the second data signal by using the extracted clock signal;

a delay device to delay the extracted clock signal by a delay amount, and to output a delayed clock signal;

another inversion device to generate another inverted clock signal by inverting the extracted clock signal, to select one of the extracted clock signal and said another inverted clock signal, and to output the selected clock signal;

a third decision device to latch the data signal output from the first decision device by using the delayed clock signal; and a fourth decision device to latch the data signal output from the second decision device by using the clock signal output from said another inversion device.

3. The optical receiver device according to claim 2, wherein:

the delay device delays the extracted clock signal by a delay amount equivalent to ¼ of a time slot of one of the first data signal and the second data signal.

4. The optical receiver device according to claim 2, wherein:

the inversion device selects and outputs the inverted clock signal when there is a differential delay equivalent to one time slot between the first data signal and the second data signal.

5. An optical receiver device for receiving an optical signal modulated using differential quadrature phase shift keying, the optical receiver device comprising:

a split device to split a received optical signal into two optical signals;

a first photoelectric conversion device to extract a first phase modulation component from one of the two optical signals, and to convert the first phase modulation component into a first data signal;

a second photoelectric conversion device to extract a second phase modulation component from the other one of the two optical signals, and to convert the second phase modulation component into a second data signal;

a clock recovery device to extract a clock signal from one of the first data signal and the second data signal, and to output an extracted clock signal;

an inversion device to generate an inverted clock signal by inverting the extracted clock signal, to select one of the extracted clock signal and the inverted clock signal depending on a differential delay between the first data signal and the second data signal, and to output the selected clock signal;

a first decision device to latch the first data signal by using the clock signal output from the inversion device;

a second decision device to latch the second data signal by using the extracted clock signal;

a delay device to delay the extracted clock signal by a delay amount, and to output a delayed clock signal;

another inversion device to generate another inverted clock signal by inverting the extracted clock signal, to select one of the extracted clock signal and said another inverted clock signal, and to output the selected clock signal;

a third decision device to latch the data signal output from the first decision device by using the clock signal output from said another inversion device; and a fourth decision device to latch the data signal output from the second decision device by using the delayed clock signal.

6. The optical receiver device according to claim 5, wherein:

the delay device delays the extracted clock signal by a delay amount equivalent to ¼ of a time slot of one of the first data signal and the second data signal.

* * * * *